United States Patent [19]

Kesting

[11] Patent Number: 4,477,598

[45] Date of Patent: Oct. 16, 1984

[54] HIGH STRENGTH NYLON BLEND MEMBRANES

[75] Inventor: Robert E. Kesting, Irvine, Calif.

[73] Assignee: Puropore, Inc., Tustin, Calif.

[21] Appl. No.: 585,563

[22] Filed: Mar. 2, 1984

Related U.S. Application Data

[62] Division of Ser. No. 370,340, Apr. 21, 1982, Pat. No. 4,450,126.

[51] Int. Cl.$^3$ ................................................ C08J 9/28
[52] U.S. Cl. ................................... 521/62; 210/500.2; 521/64; 525/432
[58] Field of Search ................... 525/432; 521/62, 64; 210/500.2

[56] References Cited

U.S. PATENT DOCUMENTS

| | | | |
|---|---|---|---|
| 3,427,277 | 2/1969 | Davis | 521/64 |
| 4,340,479 | 7/1982 | Pall | 210/500.2 |
| 4,340,480 | 7/1982 | Pall | 210/490 |

*Primary Examiner*—Morton Foelak
*Attorney, Agent, or Firm*—Hubbard and Stetina

[57] ABSTRACT

A casting solution of two nylons in formic acid, e.g., high molecular weight extrusion grade Nylon 66 homopolymer [$\eta$] about 2 or higher, and nylon multipolymer 66, 610, 6 as a strengthening polymer and gelation promoter, when cast by either the dry or wet phase inversion processes, results in highly unexpected membranes of superior strength, flexibility, and uniformity, suitable for use in microfiltration and ultrafiltration.

7 Claims, No Drawings

HIGH STRENGTH NYLON BLEND MEMBRANES

This application is a division of application Ser. No. 370,340, filed Apr. 21, 1982 now U.S. Pat. No. 4,450,126.

TECHNICAL FIELD

This invention relates to polymeric membranes, and specifically, to microporous membranes suitable for use in microfiltration, ultrafiltration, and in other applications.

Background Art

Nylon, as a polymeric material, is one of the most widely known and most versatile polymers in industry. Synthetic thermoplastic polymers characterized as polyamides are generally known as nylons. Discovery of the first nylons arose out of the classic researches of W. H. Carothers in 1928. Carothers et al were researching for new synthetic fibers. In the course of this research, they discovered that the condensation products of diacids with diamines gave long-chain polymers with the desired properties. The first nylon to be developed commercially was the condensation product of hexamethylene diamine and adipic acid, called nylon 66. Since that early discovery, a large family of nylons have been prepared by a number of processes. Nylons are still highly prized for their utility in synthetic fibers and, in addition, are used in a wide variety of applications.

One of the features of the present invention is the discovery that the blending in solution of two different nylons: The first (P1), a crystalline (high molecular weight nylon 66); and the second (P2) an amorphous binder nylon (such as the multipolymer 66/610/6), results in membranes with burst strengths and flexibilities which are significantly higher than those which are observed for membranes consisting of Type 66 or Type 6 nylon homopolymers. This is accomplished without any loss in the filtration properties of the resultant membranes.

Statement of the Invention

Both dry and wet processes have been developed for the preparation of these Nylon Blend membranes. The Dry Process consists of the complete evaporation of formic acid solutions of the nylon blends. This is believed to be the first known instance of a one-step (i.e. non leaching) type Dry Process in which a high void volume phase inversion membrane results from the complete evaporation of a casting solution containing only polymer(s) and solvent. Ordinarily the complete evaporation of such a solution results in a dense film. In the present instance, however, polymer-polymer interaction in the form of hydrogen-bonding between amide groups on neighboring polymer chains is stronger than the combined effects of polymer-solvent interaction and gravity. Thus cellular structure is maintained because the forces holding the structure in an expanded state predominate over those which tend to cause it to collapse. This is fundamentally the simplest example of the Dry Process known. The Wet Process consists of the partial evaporation of a formic acid solution of a blend of nylons until gelation has occurred, followed by a rapid desolvation of the primary gel in water.

Exemplary of such membranes are microporous membranes in which the polymer is optimally about four parts high molecular weight nylon 66 homopolymer and about 1 part multipolymer of nylon 66, 610, and 6, cast from a solution of about ten to about thirty parts of nylon per one hundred parts of formic acid, followed by removal of the solvent, preferably by complete evaporation.

The invention embodies the method of forming such membranes, the casting solutions which may be made and sold as casting solutions for carrying out the invention, and the resulting membranes.

In the following discussion, it should be understood that the hypotheses, proposed explanations and examples are given to assist in understanding the invention and do not purport to limit or constrain the scope of the invention. Use of equivalent materials and minor variations in amounts or ratios and other substitutions and variations may be made within the teachings and concept of the invention and yet result in the membranes of the invention.

The effects of variations in the ratio of the two nylons at given ratios have been established and are described hereinafter. Good integral high void volume membranes result as long as the ratio of high molecular weight crystalline nylon homopolymer to amorphous nylon multipolymer is equal to or greater than one, optimally about four, and the total nylon content of the casting solutions lies between approximately 10 and approximately 25 grams (gm) of nylon per 100 milliliters (ml) of formic acid. When said ratio is less than 1, a dense or nearly dense film results. All other factors being comparable or equal, the ratio of high molecular weight crystalline nylon homopolymer to amorphous nylon mutlipolymer should be as large as possible because the amorphous nylon is more expensive than the crystalline nylon and because it is alcohol-soluble. Hence, the resistance of the blend membrane to attack by solvents, particularly alcohols, is greater with higher ratios of crystalline homopolymer grades of nylon. On the other hand, the role of the amorphous binder nylon is to increase the strength and flexibility of the resultant membrane, so that the greater the ratio of amorphous to crystalline nylon, the stronger, and more flexible the membrane will tend to be. At a crystalline to amorphous ratio of 4, i.e., 20% nylon multipolymer, the near optimum balance between flexibility and solvent resistance is achieved. This is also the point at which the burst strength levels off. It should be noted that the burst strengths of the blend membranes are twice those of the commercially available nylon 66 homopolymer membranes. It was very surprising that the high molecular weight crystalline nylon homopolymer and the amorphous nylon were compatible over the entire range of ratios. Comparable blends are known, but are the exceptions, Paul and Newman, POLYMER BLENDS, Academic Press, New York, 1978. It is postulated, but has not been established, that this unusual compatibility and strengthening effect, which is a part of the discovery of the present invention, is the result of strong intermolecular hydrogen bonding between the two nylons, between the highly crystalline nylon and the more amorphous nylon. That such a polymeric plasticizer and strengthener can double the burst strength is a very unusual discovery indeed.

Nylons are commonly classified as "extrusion" grade or "injection" grade polymers, see e.g., MODERN PLASTICS ENCYCLOPEDIA, McGraw-Hill, published annually; see also THE INTERNATIONAL PLASTICS SELECTOR, Cordura Publications, published periodically, e.g., in 1977. This convention is adopted here because it is universally used and understood in the art. In general, the extrusion grades referred to herein will have an intrinsic viscosity in 90% formic acid at 30° C. of approximately two, or higher, i.e., $[\eta] \approx 2$, although the value "2" is not critical but indicates the general order of magnitude in which the minimum intrinsic viscosity lies.

It is believed, though not fundamental to this discovery which was most unexpected and unpredictable, that the incorporation of minor parts, i.e., less than one-half by weight of the amorphous grade nylon introduces just sufficient incompatibility into the casting solution at the point of incipient gelation to cause the total polymer system, or at least the principal polymer constituent, to gel at an early stage during evaporation *before a skin forms*. It is, of course, gelation during evaporation and the maintenance of the expanded gel structure during complete evaporation which causes the formation of a microporous membrane, see Kesting, SYNTHETIC POLYMERIC MEMBRANES, supra. While gelation does occur with the high molecular weight extrusion grade nylon, e.g., nylon 66, used by itself it does so after a skin has formed and hence the resultant membrane exhibits high resistance to flow and is of no utility for microfiltration applications. Likewise, homopolymer nylon 66 membranes produced by the complete evaporation process are weak and brittle rather than strong and flexible. When a low molecular weight injection molding grade of nylon 66 is used by itself in the complete evaporation process, no coherent membrane structure having sufficient integrity to be properly referred to as a membrane in the industrial sense results. Membranes made according to the teachings herein have been found to be tough, flexible, coherent and integral, highly suited for both laboratory and industrial use. These membranes have both excellent physical properties and excellent filtration properties, neither of which could have been guessed or expected from a knowledge of the materials and processes of the prior art.

Description of the Best Mode

In general, the process of this invention is carried out by dissolving the two nylons in formic acid. The solution may be carried out in a number of conventional ways. For example, premeasured amounts of the two nylon polymers may be introduced into a premeasured amount of formic acid and, with desired or appropriate stirring to accelerate the rate of dissolution, brought to homogeneity. Similarly, stock solutions of the respective polymers in formic acid may be prepared and then the ultimate solution prepared by stirring together predetermined amounts of respective stock solutions. The solution is usually filtered to assure that it is free of any undissolved or particulate material. The solution is then cast upon a suitable surface, usually a flat, impervious surface such as a glass plate, although the nature and configuration of the surface is not critical to this invention. The solvent is allowed to evaporate from the layer of solution. Upon complete evaporation of the solvent, when the proper polymer composition is used, the membranes of this invention result. The solution can also be formed into membranes by the wet process in which desolvation is hastened by washing the gel with water.

In the following examples, various compositions and ratios of nylons and solvents are utilized to exemplify the invention, both by way of those compositions and solutions which fall within and, therefore, performed satisfactorily according to this invention and those which do not. These examples are presented to demonstrate and aid in the understanding of the invention and are not limiting, being exemplary in presentation and not defining the outer limits of the invention.

Molecular weight, conventionally and in most instances most conveniently, is measured indirectly and is often reported, for comparison purposes, by intrinsic viscosity. This convention, described, inter alia, in Billmeyer, TEXTBOOK OF POLYMER SCIENCE, Second edition, Wiley-Interscience, New York, 1971, pp. 84–90, has been adopted herein for convenience in describing the present invention. It will be understood, however, that while different numerical values may be used, the invention may be practised using other conventions and techniques for measuring and reporting molecular weight.

According to the present invention, it has been discovered that very high quality, unusually strong and unexpectedly flexible membranes result by blending high molecular weight, i.e., $[\eta]$ in the range of approximately 2 or higher, crystalline nylon homopolymer and an amorphous nylon multipolymer nylon in a formic acid solution, forming a homogeneous casting solution and evaporating the solvent.

There is no absolute upper limit to molecular weight; however, extremely high molecular weight nylons become very difficult to process and handle, and are not readily available commercially. Unsatisfactory low molecular weight nylons, on the other hand, would have an intrinsic viscosity substantially under two, generally not greater than about 1.5. However, the quantitative viscosity values are not critical as to this invention and are given as a guide in understanding and practising the invention.

EXAMPLE 1

(Unsuitability of low MW crystalline nylon homopolymer)

20 g of nylon 66 ($[\eta]=1.24$ in 90% formic acid at 30° C.) was dissolved in 100 ml 88% formic acid. The solution was filtered and cast 0.025 in. thick on a glass plate and allowed to evaporate completely to yield an extremely friable, nonintegral, pinhole-ridden, membrane. The procedure was repeated but with 77.5% formic acid with essentially the same result. This shows the unsuitability of the low molecular weight (MW) injection molding grades of nylon 66 for making membranes by the dry process when either 88% or 77.5% formic acid is employed. Other experiments have further substantiated the need for higher MW grades of nylon to prepare membranes by the dry process.

EXAMPLE 2

15 g of nylon 66 ($[\eta]=2.29$ in 90% formic acid at 30° C.) was dissolved in 100 ml of 88% formic acid, filtered, cast 0.020 in. thick on a glass plate, and allowed to evaporate completely. The result was an opaque, white, pinhole-ridden, relatively impermeable and brittle membrane with a thick glossy skin on the side of the membrane which was in contact with glass. Although the use of higher MW nylon 66 led to a stronger membrane, it possessed a relatively thick skin and was, as a result, too impermeable to be practical. This illustrates that neither low nor high MW nylon 66 homopolymer is a suitable polymer for use per se in the dry process.

In the following examples, the abbreviation P1 refers to high molecular weight nylon 66 homopolymer as described herein; while the abbreviation P2 refers to amorphous, multipolymer nylon 66, 610, 6.

A great deal of effort has been made to determine the limits of P1/P2 and the effects of total concentrations P1+P2. Excellent high void volume membranes result as long as P1/P2≧1, and total P1+P2 lies between slightly greater than 10 g and slightly less than 25 g per 100 ml (~106 gm 90%) formic acid. When P1/P2<1, a dense film results. Thus, from approximately nine weight percent to approximately twenty weight percent, total nylon in the casting solution is optimum. A slow degradation in the solution viscosity occurs at 25° C., but the effects are not mirrored in decreased membrane strength for solutions held as long as three weeks. At 50° C., a significant decline in solution viscosity and deterioration of the resultant membranes is found overnight. Bubble point (pore size) is controlled by the total concentration of P1+P2. This data is summarized in Table I.

TABLE I

Effect of Concentration of P1* + P2** at P1/P2 = 4
Upon the Properties of Dry Process Nylon Blend Membranes

| Type | Membrane Casting Solution Concentration (g/100 ml Solvent) | Thickness (in. × $10^3$) | Water Bubble Point (psi) | Norminal Pore Size (μM) | Air Flow (lmin$^{-1}$ cm$^{-2}$ at Δ p = 10 psi) | Burst Strength (psi) |
|---|---|---|---|---|---|---|
| Blend nylon | 17 | 6.2 | 28 | 0.45 | 4.00 | 32 |
| Blend nylon | 18.5 | 6.3 | 35 | 0.45 | 2.61 | 44 |
| Blend nylon | 19 | 6.2 | 55 | 0.2 | 1–1.5 | 60 |
| Pall Ultipore (nylon 66) | | 6.0 | 53 | 0.2 | 1.69 | 24 |
| Pall Ultipore (nylon 66) | | 5.8 | 38 | 0.45 | 3.37 | 18 |
| AMF Zetapore (nylon 66) | | 4.6 | 57 | 0.2 | 0.765 | 33 |
| AMF Zetapore (nylon 66) | | 5.1 | 35 | 0.45 | 2.83 | 22 |

*P1 = Vydyne 66B (Monsanto)
**P2 = Elvamide 8061 (du Pont)

EXAMPLES 3–11

This series illustrates the effect of varying P1/P2.

EXAMPLE 3

P1/P2=19, P1+P2=16 g/100 ml; cast 0.025 in. on glass, allowed to evaporate completely and yielded a brittle membrane 0.006 in. thick with a bubble point of ~50 psi and a burst strength of 24 psi.

EXAMPLE 4

P1/P2=9, P1+P2=16 g/100 ml; cast 0.025 in. on glass, allowed to evaporate completely and yielded a 0.0054 in. thick membrane slightly more flexible than that of Example 3 with a bubble point of 56 psi and a burst strength of 35 psi.

EXAMPLE 5

P1/P2=5.66. P1+P2=17 g/100 ml; cast 0.025 in. on glass, dried, yielded a 0.0062 in. thick membrane more flexible than that of Example 4 with a bubble point of 45 psi and a burst strength of 40 psi.

EXAMPLE 6

(The Optimum Compromise) P1/P2=4, P1+P2=18.5 g/100 ml; cast 0.025 in. on glass, dried, yielded a 0.0059 in. thick membrane with outstanding flexibility (>>Example 5)—will not crack even at low relative humidity. Bubble point 36 psi; burst strength 44 psi.

EXAMPLE 7

P1/P2=3, P1+P2=16 g/100 ml; cast 0.025 in. on glass, dried, yielded a 0.005 in. thick membrane with outstanding flexibility—bubble point 50 psi; burst strength 50 psi.

EXAMPLE 8

P1/P2=2.33, P1+P2=15 g/100 ml; cast 0.025 in. on glass, dried, yielded a 0.0054 in. thick membrane with a bubble point of 45 psi and a burst strength of 46 psi.

EXAMPLE 9

P1/P2=1.5, P1+P2=15 g/100 ml; cast 0.025 in. on glass, dried, yielded a 0.0047 in. thick membrane with a bubble point of 42 psi and a burst strength of 50 psi.

EXAMPLE 10

P1/P2=1.0, P1+P2=15 g/100 ml; cast 0.025 in. on glass, dried, yielded a 0.0038 in. thick membrane with a bubble point of 34 psi and a burst strength of 52 psi.

EXAMPLE 11

P1/P2=0.66, P1+P2=15 g/100 ml; cast 0.025 in. on glass, dried, yielded a 0.0028 in. thick dense film with a bubble point >80 psi and a burst strength of 70 psi.

It is apparent that burst strength and bubble point increase and thickness decrease as P1/P2 decreases. Thus P2 is acting to both strengthen and densify the blend membrane. When P1/P2<1, a dense film results. This is apparently the result of the decreased structural regularity of P2 relative to P1 which turns to favor polymer-solvent relative to polymer-polymer interaction with the net result that gravitational effects can then tip the scale to a loss of porosity (=decreased void volume).

EXAMPLE 12

(Wet Process)

A solution P1/P2=4; P1+P2=19 g/100 ml 90% formic acid was cast 0.025 in. on glass; allowed to dry for 30 min. and then immersed in deconized water to yield a 0.006 in. thick membrane with properties similar to those of Example 6.

EXAMPLE 13

(Wet Spinning Hollow Fibers)

A solution P1/P2=4; P1+P2=25 g/100 ml; 90% formic acid was spun through a spinerette (so equipped that air was injected into the lumen of the fiber) into deionized water to yield a microporous hollow fiber which was skinless at both interior and exterior surfaces.

The blend membranes described in Examples 3-10 above also differ from existing commercially available nylon 66 homopolymer membranes in that the former are single layers and the latter are bilayers. Whereas the pore size distribution in the blend membranes is sufficiently narrow to ensure excellent bacteria retention capabilities (Table II), the homopolymer membranes apparently require a double layer to ensure sterilization efficiency. This is another advantage of the blend membranes.

Although Elvamide 8064 (same as 8061, but higher molecular weight) was also tried as P2, the best P2 found to date is Elvamide 8061. Blends of Vydyne 66B and Elvamide 8061 in 90% formic acid are clear over the entire range of P1/P2 and P1+P2 which indicates a high degree of compatibility. However near the point of incipient gelation, i.e. just prior to gelation, solutions of the blend are less compatible than solutions of the homopolymer nylon 66 which do not contain the amorphous component. The result is that the blend solutions gel at an earlier stage in evaporation before a skin has formed and hence result in membranes which are more permeable than those which result from solutions of the homopolymer alone which gel after a skin has formed. Thus, one of the key advantages of utilizing a blend is to accelerate gelation and thereby eliminate skin formation.

Although some work was done with the water/formic acid azeotrope (77.5% formic acid), the commercially available 90% formic acid proved to be a superior solvent and produced superior membranes. Solutions containing >22.5% water exhibited poor compatibility.

Tables II and III, respectively, report data proving the efficacy and advantageous characteristics of the membranes of this invention in filtration for bacterial removal and wine filtration.

Table IV summarizes the data reported in the preceding experiments.

TABLE II

| Bacteria Challenge Of Dry Process Nylon Blend Membranes | | | | | |
|---|---|---|---|---|---|
| Norminal Pore Size (μM) | Polymer Information | Bubble Point of 142 mm disk (psi) | Challenge organism | Challenge level CFU | LRV* |
| 0.45 | P1/P2 = 4, P1 + P2 = 17 | 26 | Serratia marcesens | 3.6 × 10$^{11}$ | 11.3 |
| 0.45 | P1/P2 = 4, P1 + P2 = 18.5 | 33 | Serratia marcesens | 4.8 × 10$^{11}$ | >11.7 |
| 0.2 | P1/P2 = 4, P1 + P2 = 19 | 54 | Pseudomonas diminutia | 5.17 × 10$^{10}$ | >10.7 |

The throughput of the nylon Blend membranes is excellent as deduced from a wine clog test.
*Log Reduction Valve (log of ration of number of organisms on feed side to the number on product side. By convention 0 = 1.)

TABLE III

Wine Clog Test - 0.2μM Membranes
Samples: 0.2μM Nylon Blend membrane
Millipore GS Lot C8P81964A
Gelman GA-8 Lot 83362
Samples were compared side to side

| Manifold Station | Sample | Throughput (ml) | Side Toward Pressure |
|---|---|---|---|
| 1 | X .2 | 30 | Dull |
| 2 | X .2 | 45 | Shiny |
| 3 | GS | 20 | Top |
| 4 | GS | 15 | Bottom |
| 5 | GA-8 | 55 | Dull |

TABLE III-continued

Wine Clog Test - 0.2μM Membranes
Samples: 0.2μM Nylon Blend membrane
Millipore GS Lot C8P81964A
Gelman GA-8 Lot 83362
Samples were compared side to side

| Manifold Station | Sample | Throughput (ml) | Side Toward Pressure |
|---|---|---|---|
| 6 | GA-8 | 20 | Shiny |

Applied pressure = 18 psi

TABLE IV

| | | Summary | | |
|---|---|---|---|---|
| Sample # | P1/P2 | Bubble Point | Burst (psi) | Notes & Comments |
| 1 | low MW P1 only | — | — | P1 does not form an integral membrane |
| 2 | high MW P1 only | — | — | P1 forms an integral membrane, but skinned and brittle |
| 3 | 19 | 50 | 24 | Brittle membrane |
| 4 | 9 | 56 | 35 | Slightly flexible membrane |
| 5 | 5.66 | 45 | 40 | Flexible, strong membrane |
| 6 | 4 | 36 | 44 | Outstanding strong, flexible membrane |
| 7 | 3 | 50 | 50 | Outstanding strong, flexible membrane |
| 8 | 2.33 | 45 | 46 | Satisfactory dense membrane |
| 9 | 1.5 | 42 | 50 | Satisfactory dense membrane |
| 10 | 1.0 | 34 | 52 | Marginally satisfactory dense membrane |
| 11 | .66 | >80 | 70 | Formed a non-porous film |
| 12 | 4 | — | — | (Wet Process) Similar to Example 6 membrane |
| 13 | 4 | — | — | (Wet Spinning) Hollow fiber membrane |

Of special advantage is a membrane consisting essentially of about four parts of high molecular weight intrinsic viscosity as high as about two or higher, nylon 66 extrusion grade homopolymer and about one part of multipolymer nylon 66, 610, 6, casting from a solution of generally approximately ten to approximately thirty weight percent nylon in formic acid or equivalent.

The principle of the invention is applicable to such membranes in which the extrusion grade nylon is high molecular weight nylon 6, and to other multipolymers which are sufficiently compatible with the nylon homopolymers. Such multipolymers present an irregular polymeric chain which, it is believed, interacts with the homopolymer which comprises half or more, typically about four-fifths, of the polymeric material, to initiate early gelation which is necessary to the formation of integral, high void volume microporous membranes.

The ratio of high molecular weight homopolymer nylon to low molecular multipolymer nylon is from 1:1 or above to 9:1 or less, generally in the range of 1:5:1 up to about 6:1, optimally in the range of about 4:1, e.g., 3:1 to 5:1. (See Table IV in which membranes were formed in the ranges indicated with very good, surprisingly strong and flexible membranes being formed most readily in the stated ratio of 1.5:1 to 5.7:1, i.e., about 6:1.)

Though not critical, the membranes resulted from solutions containing from about 10 to about 30 grams of nylon, total, to about 100 ml of formic acid.

There are areas, obviously, in which one may make minor variations based upon the concept of the invention and discovery described without departing from the invention, such as, for example, minor deviations in ratios or content, use of equivalent solvents and/or methods of measuring and reporting viscosity and/or molecular weight. These are not, per se, critical if in the final analysis the materials described are found in the membrane generally in the ratios reported.

Thus, according to this invention, it has been discovered that the blend of two materials, neither of which is satisfactory per se for the formation of dry process membranes when blended together and cast with a formic acid solvent, or equivalent solvent, result in a unique membrane having most surprising and unexpected flexibility and most unexpected strength. The method of preparing the membrane, the casting solution, per se, and the membrane per se, all constitute various facets of this invention.

Industrial Application

The membranes of this invention find industrial application in the formation of filter membranes for use in chemical and biological processes, e.g., in filtering wines and other beverages, in purification of liquids, and in other laboratory and industrial processes.

What is claimed is:

1. A high void volume integral microporous membrane formed by the dry phase inversion process consisting essentially of a blend of two nylon polymers cast from a formic acid solution of said polymers, said polymers being in a ratio of from about 1:1 to about 9:1 of high molecular weight crystalline nylon homopolymer to amorphous nylon multipolymer.

2. The membrane of claim 1 wherein said ratio is about 4:1.

3. The membrane of claim 1 wherein said ratio is from about 1.5:1 to about 6:1.

4. Membrane formed by the dry phase inversion process consisting essentially of a blend of high molecular weight nylon homopolymer and nylon multipolymer in a ratio of from about 1:1 up to about 9:1 cast from a formic acid solution of said nylons followed by evaporation of the formic acid.

5. Membrane according to claim 4 wherein the ratio is from greater than 1.5:1 to less than about 6:1.

6. Membrane according to claim 5 wherein the ratio is about 4:1.

7. The membranes of claims 4, 5 or 6 wherein the high molecular weight nylon is an extrusion grade nylon 66 having an intrinsic viscosity of approximately two or greater and the amorphous nylon is a multipolymer of type 66, 610, 6.

* * * * *